Aug. 3, 1948.                    H. J. ENTER                    2,446,365
               EYEPIECE WITH NON-ABRASIVE CAP MEMBER
                        Filed March 5, 1947
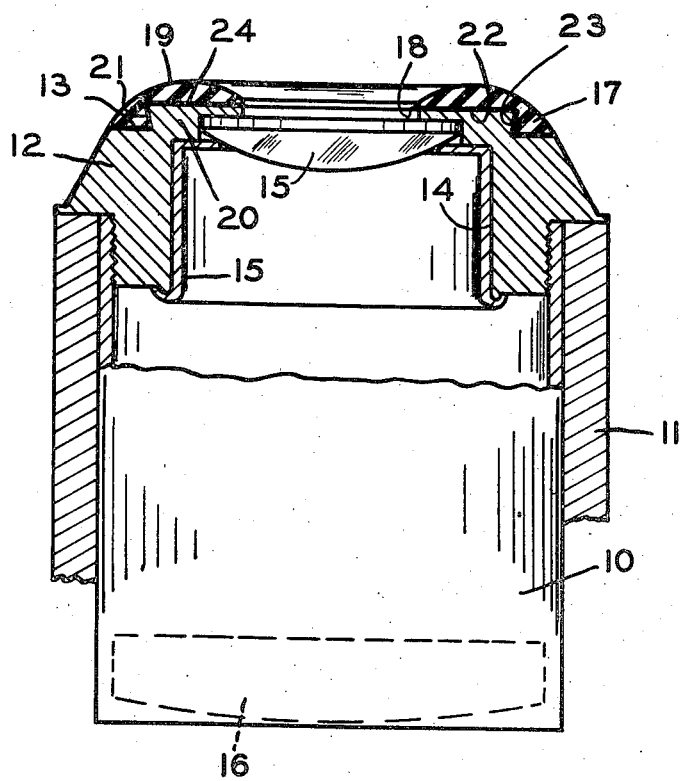
                                              HAROLD J. ENTER
                                                    Inventor
                                    By
                                                    Attorney Patented Aug. 3, 1948

2,446,365

UNITED STATES PATENT OFFICE 2,446,365

EYEPIECE WITH NONABRASIVE CAP MEMBER

Harold J. Enter, Webster, N. Y., assignor to Bausch & Lomb Optical Company, Rochester, N. Y., a corporation of New York Application March 5, 1947, Serial No. 732,508

1 Claim. (Cl. 88—57)

The present invention relates to eyepieces for optical instruments and the like and in particular relates to non-abrasive and protective cap members attached to such eyepieces.

It is an object of this invention to provide an eye-piece of the above-mentioned type which has a non-abrasive cap member secured to its end portion to form an outer contact surface whereby scratching of a spectacle lens, worn by a user of the instrument, is substantially prevented when the spectacle lens contacts the eyepiece. It is a further object to provide such a device in which the cap member is secured in an efficient manner to an eyepiece by improved means. It is a further object to provide such a device wherein the eyepiece cap member is rugged, compact, easy to clean, and of pleasing appearance. Further objects and advantages will be apparent to those skilled in this art by reference to the following description and accompanying drawing.

The single figure of the drawing shows a vertical sectional view, with parts in elevation, of a preferred form of my invention.

A preferred embodiment of my invention is illustrated in the drawing wherein an eyepiece tube 10 is held in any suitable manner in a body tube 11 of an optical instrument, such as, for instance, a microscope. The tube 10 is provided with a closure or lens mounting member 12 at its outer end, having an outer face 13 in which a central lens openings 14 is formed. A lens 15 is mounted in the lens opening 14 by suitable means such as a lens retainer 15' in optical alignment with a second lens 16 arranged in the tube 10.

A pad or cap member 17 of any suitable non-abrasive material which will not scratch glass, such as rubber or plastic, is secured to the lens mounting member 12 so as to overlie and cover the outer face 13 of the mounting member 12. At the center of the pad 17, an opening 18 is formed concentric with the lens opening 14. The outer contact surface 19 of the pad is preferably molded to form a smooth convex ridge of partial toroidal shape around the opening 18 against which the user's spectacle lens may rest without damage when using the instrument. For aesthetic effect, the surface 19 may be blended with the surface of the mounting member 12 as shown in the drawing.

For the purpose of positioning the annular cap or pad member 17 on the lens mounting member 12, a projecting portion preferably in the form of a circular boss 20 is provided on the mounting member terminating at its outer edge in an outwardly inclined annular shoulder 21 by which the cap member is laterally located. In order to secure the cap member 17 on the lens mounting member, an annular recess 22 is formed in the lower side of the pad 17 terminating peripherally in a shoulder 23. Circular boss 20 fits within the recess 22 so that shoulders 23 and 21 are in close contact and said shoulders are inclined as shown or may be formed with reentrant portions so as to secure the cap member 17 to the lens mounting member 12. As an aid to securing the cap member 17, cement 24 may be used on the contacting surfaces between the cap member and lens mounting member, sufficient clearance being provided therebetween to permit a satisfactory thickness of cement to be obtained.

In assembling this device the lens mounting member 12 is covered with the adhesive 24 on those surfaces in contact with the rubber cap member. The cap member 17 is then forced down over the projection 20 and held in place until the cement dries after which the excess cement is removed.

It will be seen that there is here provided a simple and effective protective cap of good appearance by which the objects of this invention are attained. It will also be noted that if the cement 13 should loosen, the cap member 17 will not fall off since the engagement of the inclined shoulders 23 and 21 prevents removal without a definite effort. In addition all extraneous holding devices such as screws and protruding lips are avoided in mounting the cap member 17. While the cap member 17 may be formed of various types of non-metallic material which will not scratch the glass of a spectacle lens, I preferably make cap 17 of a semi-soft rubber which may be molded.

Although but a single embodiment of this invention has been shown and described in detail, it will be understood that other embodiments are possible and that changes may be made in the details thereof or arrangements of the parts and substitutions may be made therein without departing from the spirit of the invention as defined in the appended claim.

I claim:

In an optical instrument eyepiece, the combination of an eyepiece tube closed at its outer end by a lens mounting member having a central opening, a boss projecting above the surface of the member around the opening, a shoulder on said boss forming a reentrant portion, and an annular cap member overlying the surface of the mounting member, said cap member having an annular recess with a peripheral reentrant portion, said portions cooperating to hold the cap member on the mounting member, said cap member being formed of a relatively soft material which will not scratch the surface of a spectacle lens upon contact therewith.

HAROLD J. ENTER.

REFERENCES CITED

The following references are of record in the file of this patent:

UNITED STATES PATENTS

| Number | Name | Date |
|---|---|---|
| 967,143 | Arriaga | Aug. 9, 1910 |
| 1,229,117 | Mihalyi | June 5, 1917 |
| 1,270,771 | Bausch | July 2, 1918 |
| 1,482,893 | Hart | Feb. 5, 1924 |
| 2,351,747 | Exkert | June 20, 1944 |
| 2,381,101 | Bausch | Aug. 7, 1945 |
| 2,388,051 | Guellich | Oct. 30, 1945 |